US012660822B1

(12) United States Patent (10) Patent No.: US 12,660,822 B1
Ghiglione et al. (45) Date of Patent: Jun. 23, 2026

(54) HERBICIDAL COMBINATIONS COMPRISING SAFLUFENACIL AND EPYRIFENACIL

(71) Applicant: BASF AGRO B.V., Arnhem (NL)

(72) Inventors: Hernan Ghiglione, Durham, NC (US); Brady Scott Asher, Durham, NC (US); Maira Paes Lacerda, Limburgerhof (DE); Claude Taranta, Limburgerhof (DE)

(73) Assignee: BASF AGRO B.V., Arnhem (NL)

( * ) Notice: Subject to any disclaimer, the term of this patent is extended or adjusted under 35 U.S.C. 154(b) by 0 days.

(21) Appl. No.: 19/198,730

(22) Filed: May 5, 2025

Related U.S. Application Data

(60) Provisional application No. 63/786,659, filed on Apr. 10, 2025.

(51) Int. Cl.
*A01N 43/54* (2006.01)
*A01N 43/84* (2006.01)
*A01P 13/02* (2006.01)

(52) U.S. Cl.
CPC ............. *A01N 43/54* (2013.01); *A01N 43/84* (2013.01); *A01P 13/02* (2021.08)

(58) Field of Classification Search
CPC .......... A01N 43/54; A01N 43/84; A01P 13/02
See application file for complete search history.

(56) References Cited

U.S. PATENT DOCUMENTS 10,863,743 B2 * 12/2020 Armel .................. C07D 239/54
2022/0322666 A1 * 10/2022 Jin .......................... A01P 13/02

FOREIGN PATENT DOCUMENTS

EP         3028573 A1      6/2016
WO    WO-2017/011288 A1   1/2017
WO    WO-2017/202768 A1   11/2017
WO    WO-2018/108695 A1   6/2018
WO    WO-2021/013799 A1   1/2021
WO    WO-2021/175689 A1   9/2021
WO    WO-2022/138633 A1   6/2022

OTHER PUBLICATIONS

Geier, P.W., Dose Response of Five Broadleaf Weeds to Saflufenacil, 2009, Weed Technology, vol. 23, pp. 313-316. (Year: 2009).*
Colby, "Calculating synergistic and antagonistic responses of herbicide combinations", Weeds, vol. 15, Issue 1, Jan. 1967, pp. 20-22.

* cited by examiner

*Primary Examiner* — Ali Soroush
*Assistant Examiner* — Andriae M Holt
(74) *Attorney, Agent, or Firm* — MARSHALL, GERSTEIN & BORUN LLP

(57) ABSTRACT

The present invention relates to a combination or a composition comprising saflufenacil and epyrifenacil as well as to a method for weed control, which method comprises applying an effective amount of said herbicidal combination or composition to a non-crop area or to the cultivation area of a crop, where weeds grow or may grow. The invention also relates the use of the combination or of the composition comprising saflufenacil and epyrifenacil for weed control in a non-crop area or in the cultivation area of a crop.

15 Claims, No Drawings

HERBICIDAL COMBINATIONS COMPRISING SAFLUFENACIL AND EPYRIFENACIL

This application claims the benefit of U.S. Provisional Application No. 63/786,659, filed on Apr. 10, 2025, the contents of which are hereby incorporated by reference herein in their entirety.

The present invention relates to a combination or a composition comprising saflufenacil and epyrifenacil as well as to a method for weed control, which method comprises applying an effective amount of said herbicidal combination or composition to a non-crop area or to the cultivation area of a crop, where weeds grow or may grow. The invention also relates the use of the combination or composition comprising saflufenacil and epyrifenacil for weed control in a non-crop area or in the cultivation area of a crop.

Weed control is a critical and pressing concern in agricultural practice, impacting crop productivity and overall agricultural sustainability.

Weeds compete with crops for essential resources such as water, nutrients, and sunlight. Their rapid growth and aggressive nature can significantly reduce crop yields if not adequately controlled. Over time, weeds can develop resistance to herbicides, making them less susceptible to chemical control methods. This can render certain herbicides ineffective and limit the options available for weed management. In addition, different weed species often coexist in agricultural fields. Ensuring effective control of diverse weeds can be a significant challenge. Thus, herbicidal combinations that provide broad-spectrum control against multiple weed species are highly desirable.

Addressing these challenges requires innovative solutions involving continuous research and development efforts to enhance weed control strategies while minimizing their impact on the environment and crop productivity. New herbicidal combinations belong to such innovative solutions. Therefore, it was an object of the present invention to provide such combinations.

This object is achieved by an herbicidal combination comprising (A) saflufenacil and
(B) epyrifenacil in a weight ratio [w/w] of (A):(B) being from 20:1 to 1:20.

Surprisingly, it has now been found that weeds that grow or will grow in a non-crop area or in a cultivation area of crops are controlled by applying to these areas an effective amount of said combination. It can be applied as such or appropriately formulated (agrochemical composition).

Accordingly, the present invention is directed to an herbicidal combination comprising (A) saflufenacil and
(B) epyrifenacil in a weight ratio [w/w] of (A):(B) being from 20:1 to 1:20.

The inventive combination demonstrates a strong herbicidal activity, in particular at low application rates, and/or a high compatibility with crop plants, in particular low phytotoxicity to the crops. It shows an over-additive (synergistic) effect in weed control in comparison with solo application of the individual herbicides. It provides for a broad activity spectrum against many different unwanted plants as well as weed control over an adequately long period, thus allowing flexible application.

The present invention is also directed to agrochemical compositions for weed control, comprising saflufenacil (Component A) and epyrifenacil (Component B) in a weight ratio [w/w] of (A):(B) being from 20:1 to 1:20, and one or more auxiliaries customary for herbicidal products or crop protection compositions.

Further, the invention is directed to a method for controlling weeds, which method comprises applying an effective amount of a combination or a composition comprising saflufenacil (Component A) and epyrifenacil (Component B) in a weight ratio [w/w] of (A):(B) being from 20:1 to 1:20 to the non-crop area or to the cultivation area of a crop, where weeds grow or may grow.

Additionally, the invention is directed to a use of a combination or a composition comprising saflufenacil (Component A) and epyrifenacil (Component B) in a weight ratio [w/w] of (A):(B) being from 20:1 to 1:20 for controlling weeds in non-crop areas or in cultivation areas of a crop, where weeds grow or may grow.

The method of the present invention for controlling weeds has several advantages over methods applying individual Components A or B or other herbicidal combinations:

The herbicide combinations of the present invention show enhanced herbicide action (efficacy) in comparison with solo application of the individual herbicides. Surprisingly, herbicide combinations of the present invention show an over-additive or synergistic effect in weed control in comparison with solo application of the individual herbicides.

Through their enhanced herbicide action, the herbicide combinations of the present invention can be applied at lower rates to achieve the desired herbicidal effect, reducing the potential negative impact on the environment, including soil and water quality, beneficial organisms, and non-target plants.

The herbicide combinations of the present invention show an increased spectrum of weed control in comparison with solo application of the individual herbicides.

The herbicide combinations of the present invention reduce the likelihood of resistance development in comparison with solo application of the individual herbicides.

The herbicide combinations of the present invention may provide more effective control of herbicide resistant weeds in comparison with solo application of the individual herbicides. In general, losses of efficacy (due to resistance development) in individual plants may be compensated to a limited extent by higher application rates of herbicides, with the potential side effect of increased crop damage (reduced selectivity). The herbicide combinations of the present invention achieve control of resistant weeds while maintaining a low crop response, especially in monocotyledonous crops.

The herbicide combinations of the present invention may also show an accelerated action on weeds, i.e. they may affect damage of the harmful plants more quickly in comparison with solo application of the individual herbicides.

The herbicide combinations of the invention provide for an adequate duration of herbicidal activity, even under difficult weathering conditions, which allows a more flexible application and minimizes the risk of weeds escaping.

The skilled person will acknowledge that the weight ratio range of saflufenacil (A): epyrifenacil (B) in the combinations or compositions according to the invention encompasses the ratios 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20.

Preferably, in the combinations or compositions according to the invention saflufenacil (A) and epyrifenacil (B) are present in a weight ratio from 15:1 to 1:15, more preferably from 10:1 to 1:10, even more preferably from 5:1 to 1:5, most preferably from 4:1 to 1:4, specifically from 2:1 to 1:2 including 1:1.

In the methods according to the present invention, the required application rate of saflufenacil (Component A) and epyrifenacil (Component B) depends on the density of the undesired vegetation, on the development stage of the plants, on the climatic conditions of the location where the combination or composition comprising saflufenacil (A) and epyrifenacil (B) is used and on the application method.

The application rate of saflufenacil (A) is usually from 1 to 500 g/ha, preferably from 1 to 250 g/ha, more preferably from 2 to 100 g/ha, most preferably from 5 to 50 g/ha of active substance, e.g. 5 g/ha, 6 g/ha, 7 g/ha, 8 g/ha, 9 g/ha, 10 g/ha, 11 g/ha, 12 g/ha, 13 g/ha, 14 g/ha, 15 g/ha, 16 g/ha, 17 g/ha, 18 g/ha, 19 g/ha, 20 g/ha, 21 g/ha, 22 g/ha, 23 g/ha, 24 g/ha, 25 g/ha, 26 g/ha, 27 g/ha, 28 g/ha, 29 g/ha, 30 g/ha, 31 g/ha, 32 g/ha, 33 g/ha, 34 g/ha, 35 g/ha, 36 g/ha, 37 g/ha, 38 g/ha, 39 g/ha, 40 g/ha, 41 g/ha, 42 g/ha, 43 g/ha, 44 g/ha, 45 g/ha, 46 g/ha, 47 g/ha, 48 g/ha, 49 g/ha, 50 g/ha.

The application rate of epyrifenacil (B) is usually from 1 to 500 g/ha, preferably from 1 to 250 g/ha, more preferably from 2 to 100 g/ha, most preferably from 5 to 50 g/ha of active substance, e.g. 5 g/ha, 6 g/ha, 7 g/ha, 8 g/ha, 9 g/ha, 10 g/ha, 11 g/ha, 12 g/ha, 13 g/ha, 14 g/ha, 15 g/ha, 16 g/ha, 17 g/ha, 18 g/ha, 19 g/ha, 20 g/ha, 21 g/ha, 22 g/ha, 23 g/ha, 24 g/ha, 25 g/ha, 26 g/ha, 27 g/ha, 28 g/ha, 29 g/ha, 30 g/ha, 31 g/ha, 32 g/ha, 33 g/ha, 34 g/ha, 35 g/ha, 36 g/ha, 37 g/ha, 38 g/ha, 39 g/ha, 40 g/ha, 41 g/ha, 42 g/ha, 43 g/ha, 44 g/ha, 45 g/ha, 46 g/ha, 47 g/ha, 48 g/ha, 49 g/ha, 50 g/ha.

Non-limiting examples for application rates of saflufenacil (A) and epyrifenacil (B) in the methods according to the present invention for controlling weeds in non-crop areas or in cultivation areas of a crop are listed below in the format A (g/ha)+B (g/ha) (List AB):

| List AB: Applications rates of A (g/ha) + B (g/ha) | |
| --- | --- |
| 1. | 5 + 5 |
| 2. | 5 + 7.5 |
| 3. | 5 + 10 |
| 4. | 5 + 12.5 |
| 5. | 5 + 15 |
| 6. | 5 + 17.5 |
| 7. | 5 + 20 |
| 8. | 5 + 22.5 |
| 9. | 5 + 25 |
| 10. | 5 + 27.5 |
| 11. | 5 + 30 |
| 12. | 5 + 32.5 |
| 13. | 5 + 35 |
| 14. | 5 + 37.5 |
| 15. | 5 + 40 |
| 16. | 5 + 42.5 |
| 17. | 5 + 45 |
| 18. | 5 + 47.5 |
| 19. | 5 + 50 |
| 20. | 7.5 + 5 |
| 21. | 7.5 + 7.5 |
| 22. | 7.5 + 10 |
| 23 | 7.5 + 12.5 |
| 24. | 7.5 + 15 |
| 25. | 7.5 + 17.5 |
| 26. | 7.5 + 20 |
| 27. | 7.5 + 22.5 |

-continued

| List AB: Applications rates of A (g/ha) + B (g/ha) | |
| --- | --- |
| 28. | 7.5 + 25 |
| 29. | 7.5 + 27.5 |
| 30. | 7.5 + 30 |
| 31. | 7.5 + 32.5 |
| 32. | 7.5 + 35 |
| 33. | 7.5 + 37.5 |
| 34. | 7.5 + 40 |
| 35. | 7.5 + 42.5 |
| 36. | 7.5 + 45 |
| 37. | 7.5 + 47.5 |
| 38. | 7.5 + 50 |
| 39. | 10 + 5 |
| 40. | 10 + 7.5 |
| 41. | 10 + 10 |
| 42. | 10 + 12.5 |
| 43. | 10 + 15 |
| 44 | 10 + 17.5 |
| 45. | 10 + 20 |
| 46. | 10 + 22.5 |
| 47. | 10 + 25 |
| 48. | 10 + 27.5 |
| 49. | 10 + 30 |
| 50. | 10 + 32.5 |
| 51. | 10 + 35 |
| 52. | 10 + 37.5 |
| 53. | 10 + 40 |
| 54. | 10 + 42.5 |
| 55. | 10 + 45 |
| 56. | 10 + 47.5 |
| 57. | 10 + 50 |
| 58. | 12.5 + 5 |
| 59. | 12.5 + 7.5 |
| 60. | 12.5 + 10 |
| 61. | 12.5 + 12.5 |
| 62. | 12.5 + 15 |
| 63. | 12.5 + 17.5 |
| 64. | 12.5 + 20 |
| 65. | 12.5 + 22.5 |
| 66. | 12.5 + 25 |
| 67. | 12.5 + 27.5 |
| 68. | 12.5 + 30 |
| 69. | 12.5 + 32.5 |
| 70. | 12.5 + 35 |
| 71. | 12.5 + 37.5 |
| 72. | 12.5 + 40 |
| 73. | 12.5 + 42.5 |
| 74. | 12.5 + 45 |
| 75. | 12.5 + 47.5 |
| 76. | 12.5 + 50 |
| 77. | 15 + 5 |
| 78. | 15 + 7.5 |
| 79. | 15 + 10 |
| 80. | 15 + 12.5 |
| 81. | 15 + 15 |
| 82. | 15 + 17.5 |
| 83. | 15 + 20 |
| 84. | 15 + 22.5 |
| 85. | 15 + 25 |
| 86. | 15 + 27.5 |
| 87. | 15 + 30 |
| 88. | 15 + 32.5 |
| 89. | 15 + 35 |
| 90. | 15 + 37.5 |
| 91. | 15 + 40 |
| 92. | 15 + 42.5 |
| 93. | 15 + 45 |
| 94. | 15 + 47.5 |
| 95. | 15 + 50 |
| 96. | 17.5 + 5 |
| 97. | 17.5 + 7.5 |
| 98. | 17.5 + 10 |
| 99. | 17.5 + 12.5 |
| 100. | 17.5 + 15 |
| 101. | 17.5 + 17.5 |
| 102. | 17.5 + 20 |
| 103. | 17.5 + 22.5 |

-continued

-continued

| List AB: Applications rates of A (g/ha) + B (g/ha) | | | | List AB: Applications rates of A (g/ha) + B (g/ha) | |
|---|---|---|---|---|---|
| 104. | 17.5 + 25 | | 180. | 27.5 + 25 | |
| 105. | 17.5 + 27.5 | | 181. | 27.5 + 27.5 | |
| 106. | 17.5 + 30 | | 182. | 27.5 + 30 | |
| 107. | 17.5 + 32.5 | | 183. | 27.5 + 32.5 | |
| 108. | 17.5 + 35 | | 184. | 27.5 + 35 | |
| 109. | 17.5 + 37.5 | | 185. | 27.5 + 37.5 | |
| 110. | 17.5 + 40 | | 186. | 27.5 + 40 | |
| 111. | 17.5 + 42.5 | | 187. | 27.5 + 42.5 | |
| 112. | 17.5 + 45 | | 188. | 27.5 + 45 | |
| 113. | 17.5 + 47.5 | | 189. | 27.5 + 47.5 | |
| 114. | 17.5 + 50 | | 190. | 27.5 + 50 | |
| 115. | 20 + 5 | | 191. | 30 + 5 | |
| 116. | 20 + 7.5 | | 192. | 30 + 7.5 | |
| 117. | 20 + 10 | | 193. | 30 + 10 | |
| 118. | 20 + 12.5 | | 194. | 30 + 12.5 | |
| 119. | 20 + 15 | | 195. | 30 + 15 | |
| 120. | 20 + 17.5 | | 196. | 30 + 17.5 | |
| 121. | 20 + 20 | | 197. | 30 + 20 | |
| 122. | 20 + 22.5 | | 198. | 30 + 22.5 | |
| 123. | 20 + 25 | | 199. | 30 + 25 | |
| 124. | 20 + 27.5 | | 200. | 30 + 27.5 | |
| 125. | 20 + 30 | | 201. | 30 + 30 | |
| 126. | 20 + 32.5 | | 202. | 30 + 32.5 | |
| 127. | 20 + 35 | | 203. | 30 + 35 | |
| 128. | 20 + 37.5 | | 204. | 30 + 37.5 | |
| 129. | 20 + 40 | | 205. | 30 + 40 | |
| 130. | 20 + 42.5 | | 206. | 30 + 42.5 | |
| 131. | 20 + 45 | | 207. | 30 + 45 | |
| 132. | 20 + 47.5 | | 208. | 30 + 47.5 | |
| 133. | 20 + 50 | | 209. | 30 + 50 | |
| 134. | 22.5 + 5 | | 210. | 32.5 + 5 | |
| 135. | 22.5 + 7.5 | | 211. | 32.5 + 7.5 | |
| 136. | 22.5 + 10 | | 212. | 32.5 + 10 | |
| 137. | 22.5 + 12.5 | | 213. | 32.5 + 12.5 | |
| 138. | 22.5 + 15 | | 214. | 32.5 + 15 | |
| 139. | 22.5 + 17.5 | | 215. | 32.5 + 17.5 | |
| 140. | 22.5 + 20 | | 216. | 32.5 + 20 | |
| 141. | 22.5 + 22.5 | | 217. | 32.5 + 22.5 | |
| 142. | 22.5 + 25 | | 218. | 32.5 + 25 | |
| 143. | 22.5 + 27.5 | | 219. | 32.5 + 27.5 | |
| 144. | 22.5 + 30 | | 220. | 32.5 + 30 | |
| 145. | 22.5 + 32.5 | | 221. | 32.5 + 32.5 | |
| 146. | 22.5 + 35 | | 222. | 32.5 + 35 | |
| 147. | 22.5 + 37.5 | | 223. | 32.5 + 37.5 | |
| 148. | 22.5 + 40 | | 224. | 32.5 + 40 | |
| 149. | 22.5 + 42.5 | | 225. | 32.5 + 42.5 | |
| 150. | 22.5 + 45 | | 226. | 32.5 + 45 | |
| 151. | 22.5 + 47.5 | | 227. | 32.5 + 47.5 | |
| 152. | 22.5 + 50 | | 228. | 32.5 + 50 | |
| 153. | 25 + 5 | | 229. | 35 + 5 | |
| 154. | 25 + 7.5 | | 230. | 35 + 7.5 | |
| 155. | 25 + 10 | | 231. | 35 + 10 | |
| 156. | 25 + 12.5 | | 232. | 35 + 12.5 | |
| 157. | 25 + 15 | | 233. | 35 + 15 | |
| 158. | 25 + 17.5 | | 234. | 35 + 17.5 | |
| 159. | 25 + 20 | | 235. | 35 + 20 | |
| 160. | 25 + 22.5 | | 236. | 35 + 22.5 | |
| 161. | 25 + 25 | | 237. | 35 + 25 | |
| 162. | 25 + 27.5 | | 238. | 35 + 27.5 | |
| 163. | 25 + 30 | | 239. | 35 + 30 | |
| 164. | 25 + 32.5 | | 240. | 35 + 32.5 | |
| 165. | 25 + 35 | | 241. | 35 + 35 | |
| 166. | 25 + 37.5 | | 242. | 35 + 37.5 | |
| 167. | 25 + 40 | | 243. | 35 + 40 | |
| 168. | 25 + 42.5 | | 244. | 35 + 42.5 | |
| 169. | 25 + 45 | | 245. | 35 + 45 | |
| 170. | 25 + 47.5 | | 246. | 35 + 47.5 | |
| 171. | 25 + 50 | | 247. | 35 + 50 | |
| 172. | 27.5 + 5 | | 248. | 37.5 + 5 | |
| 173. | 27.5 + 7.5 | | 249. | 37.5 + 7.5 | |
| 174. | 27.5 + 10 | | 250. | 37.5 + 10 | |
| 175. | 27.5 + 12.5 | | 251. | 37.5 + 12.5 | |
| 176. | 27.5 + 15 | | 252. | 37.5 + 15 | |
| 177. | 27.5 + 17.5 | | 253. | 37.5 + 17.5 | |
| 178. | 27.5 + 20 | | 254. | 37.5 + 20 | |
| 179. | 27.5 + 22.5 | | 255. | 37.5 + 22.5 | |

-continued

| List AB: Applications rates of A (g/ha) + B (g/ha) | |
|---|---|
| 256. | 37.5 + 25 |
| 257. | 37.5 + 27.5 |
| 258. | 37.5 + 30 |
| 259. | 37.5 + 32.5 |
| 260. | 37.5 + 35 |
| 261. | 37.5 + 37.5 |
| 262. | 37.5 + 40 |
| 263. | 37.5 + 42.5 |
| 264. | 37.5 + 45 |
| 265. | 37.5 + 47.5 |
| 266. | 37.5 + 50 |
| 267. | 40 + 5 |
| 268. | 40 + 7.5 |
| 269. | 40 + 10 |
| 270. | 40 + 12.5 |
| 271. | 40 + 15 |
| 272. | 40 + 17.5 |
| 273. | 40 + 20 |
| 274. | 40 + 22.5 |
| 275. | 40 + 25 |
| 276. | 40 + 27.5 |
| 277. | 40 + 30 |
| 278. | 40 + 32.5 |
| 279. | 40 + 35 |
| 280. | 40 + 37.5 |
| 281. | 40 + 40 |
| 282. | 40 + 42.5 |
| 283. | 40 + 45 |
| 284. | 40 + 47.5 |
| 285. | 40 + 50 |
| 286. | 42.5 + 5 |
| 287. | 42.5 + 7.5 |
| 288. | 42.5 + 10 |
| 289. | 42.5 + 12.5 |
| 290. | 42.5 + 15 |
| 291. | 42.5 + 17.5 |
| 292. | 42.5 + 20 |
| 293. | 42.5 + 22.5 |
| 294. | 42.5 + 25 |
| 295. | 42.5 + 27.5 |
| 296. | 42.5 + 30 |
| 297. | 42.5 + 32.5 |
| 298. | 42.5 + 35 |
| 299. | 42.5 + 37.5 |
| 300. | 42.5 + 40 |
| 301. | 42.5 + 42.5 |
| 302. | 42.5 + 45 |
| 303. | 42.5 + 47.5 |
| 304. | 42.5 + 50 |
| 305. | 45 + 5 |
| 306. | 45 + 7.5 |
| 307. | 45 + 10 |
| 308. | 45 + 12.5 |
| 309. | 45 + 15 |
| 310. | 45 + 17.5 |
| 311. | 45 + 20 |
| 312. | 45 + 22.5 |
| 313. | 45 + 25 |
| 314. | 45 + 27.5 |
| 315. | 45 + 30 |
| 316. | 45 + 32.5 |
| 317. | 45 + 35 |
| 318. | 45 + 37.5 |
| 319. | 45 + 40 |
| 320. | 45 + 42.5 |
| 321. | 45 + 45 |
| 322. | 45 + 47.5 |
| 323. | 45 + 50 |
| 324. | 47.5 + 5 |
| 325. | 47.5 + 7.5 |
| 326. | 47.5 + 10 |
| 327. | 47.5 + 12.5 |
| 328. | 47.5 + 15 |
| 329. | 47.5 + 17.5 |
| 330. | 47.5 + 20 |
| 331. | 47.5 + 22.5 |

-continued

| List AB: Applications rates of A (g/ha) + B (g/ha) | |
|---|---|
| 332. | 47.5 + 25 |
| 333. | 47.5 + 27.5 |
| 334. | 47.5 + 30 |
| 335. | 47.5 + 32.5 |
| 336. | 47.5 + 35 |
| 337. | 47.5 + 37.5 |
| 338. | 47.5 + 40 |
| 339. | 47.5 + 42.5 |
| 340. | 47.5 + 45 |
| 341. | 47.5 + 47.5 |
| 342. | 47.5 + 50 |
| 343. | 50 + 5 |
| 344. | 50 + 7.5 |
| 345. | 50 + 10 |
| 346. | 50 + 12.5 |
| 347. | 50 + 15 |
| 348. | 50 + 17.5 |
| 349. | 50 + 20 |
| 350. | 50 + 22.5 |
| 351. | 50 + 25 |
| 352. | 50 + 27.5 |
| 353. | 50 + 30 |
| 354. | 50 + 32.5 |
| 355. | 50 + 35 |
| 356. | 50 + 37.5 |
| 357. | 50 + 40 |
| 358. | 50 + 42.5 |
| 359. | 50 + 45 |
| 360. | 50 + 47.5 |
| 361. | 50 + 50 |

The List AB discloses 361 specific embodiments of the present invention directed to a method for controlling weeds, which method comprises applying a combination or a composition comprising saflufenacil (A) and epyrifenacil (B) in a weight ratio [w/w] of (A):(B) being from 10:1 to 1:10 to the non-crop area or to the cultivation area of a crop, where weeds grow or may grow, wherein the application rates of saflufenacil (A) and epyrifenacil (B) are in each case as defined in each separate entry of the List AB.

For example, embodiment A.161 (List AB, entry 161) discloses a method for controlling weeds, which method comprises applying a combination or a composition comprising saflufenacil (A) and epyrifenacil (B) in a weight ratio [w/w] of (A):(B) being 1:1 to the non-crop area or to the cultivation area of a crop, where weeds grow or may grow, wherein the application rate of saflufenacil (A) is 25 g/ha and the application rate of epyrifenacil (B) is 25 g/ha.

The combination or the composition comprising saflufenacil (A) and epyrifenacil (B) can generally be applied to weeds at any growth stage with good results. BBCH growth stages are as defined in "Growth stages of mono- and dicotyledonous plants", BBCH Monograph edited by Uwe Meier Julius Kühn-Institut (JKI), Open Agrar Repositorium, Quedlinburg 2018 DOI: 10.5073/20180906-074619 ISBN: 978-3-95547-071-5.

According to the present invention, in the method for controlling weeds in crops, the combinations or compositions according to the invention can generally be applied for pre-plant burn-down, as pre-emergence treatment of the crop or as post-emergence treatment of PPO inhibitor tolerant crop, preferably as pre-emergence treatment of the crop or post-emergence treatment of PPO inhibitor tolerant crop.

Additionally, the combination combinations or compositions according to the invention can be applied for pre-harvest desiccation of a crop. Usually, the application is post-emergence of the crop, typically when the crop has reached physiological maturity.

The present invention also relates to a method for selectively controlling weeds in crops, such as cereals, maize, soybean, cotton, canola, *sorghum* and rice, preferably maize, soybean and cotton.

Weeds, which are controlled by the method according to the present invention include monocots and dicots.

Further embodiments of the invention are evident from the description, the examples and the claims. The preferred embodiments of the invention mentioned herein are being preferred either independently from each other or in combination with one another.

The features of the present invention described herein can be applied not only in the combination given in each particular case but also in other combinations, without leaving the scope of the invention.

The recitation of ranges of values is a way of referring to each separate value within the range. This means that each individual value within the range is disclosed as if it were individually recited. The range includes the endpoints, and any combination of values within the range can be used independently. When referring to numerical values or numerical ranges, integers and fractions within the range are included unless the context clearly indicates otherwise.

Exemplary, a range of 1 to 50 includes all values between 1 and 50 including the endpoints, i.e. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 and 50, as well as values like 30.1, 35.4, 42.5, 48.8 and so on.

As used herein, the terms "controlling" and "combating" are synonyms, referring to inhibition of growth, control of growth, reduction of growth or complete destruction of weeds.

As used herein, the term "combination" refers to any combination of Components A and B, including compositions comprising Components A and B. In the context of the present invention, it is immaterial whether saflufenacil (Component A) and epyrifenacil (Component B) are formulated separately or jointly. It is also immaterial, whether saflufenacil (Component A) and epyrifenacil (Component B) are applied jointly or separately. In the case of separate application, it is of minor importance, in which order the application takes place. It is only necessary that saflufenacil and epyrifenacil, are applied in an effective amount and in a timeframe that allows simultaneous action of the Components on the plants, usually within a timeframe of at most 14 days, preferably at most 10 days, in particular at most 7 days, very particular at most 1 day.

As used herein, the term "composition" refers to compositions or mixtures comprising saflufenacil (A) and epyrifenacil (B).

As used herein, the term "agrochemical composition" refers to compositions or mixtures comprising saflufenacil (A), epyrifenacil (B), and one or more auxiliaries customary for herbicidal products or crop protection compositions.

As used herein "herbicide" refers to one or more agents, compounds and/or compositions having herbistatic and/or herbicidal activity.

As used herein, the terms "undesirable vegetation", "undesirable species", "undesirable plants", "harmful plants", "undesirable weeds", "volunteer plants", "weeds" or "harmful weeds" are used synonymously.

As used herein, the term "an effective amount" refers to the quantity or application rate of the Components A and B that is necessary to achieve the desired effect or result. It is the amount of the Components A and B that is sufficient to effectively control or eliminate the target weeds or plants, while minimizing any adverse effects on non-target organisms or the environment. The specific effective amount may vary depending on factors such as target plant species, application method, environmental conditions, and the desired level of control.

Synergism can be determined by the Colby method (Colby, S. R., Weeds, 1967 (15), p. 20-22), i.e. the expected (or predicted) response of the combination is calculated by taking the product of the observed response for each individual component of the combination when applied alone divided by 100 and subtracting this value from the sum of the observed response for each component when applied alone. Synergism of the combination is then determined by comparing the observed response of the combination to the expected (or predicted) response as calculated from the observed responses of each individual component alone. If the observed response of the combination is significantly greater than the expected (or predicted) response as determined by Fisher's protected Least Significant Difference (LSD) test using significance level 0.05, than the combination is said to be synergistic.

The foregoing is illustrated mathematically as follows:

$$(X+Y)-XY/100=\text{Expected response (Exp.)}$$

and $$\text{Synergism}=(Obs.-\text{Exp.})>LSD,$$

wherein a combination is composed of components X and Y, and Obs. designates the observed response of this combination. The synergistic effect may also be given as the ratio of the observed response and the expected response in percent, i.e.

$$\text{synergistic effect } [\%]=Obs./\text{Exp.}\times100$$

As used herein, "pre-plant burndown" refers to the practice of applying a herbicide to a field or area before planting crops. The purpose of pre-plant burndown is to control or eliminate existing weeds or vegetation to create a weed-free environment for the crops. Pre-plant burndown can also help to prevent the development of herbicide-resistant weeds, as it reduces the overall weed seed bank in the soil.

As used herein, "pre-emergence" refers to an herbicide treatment that is applied to an area before the crop has emerged from the ground or growing medium.

As used herein, "post-emergence" refers to an herbicide treatment that is applied to an area after the crop has germinated and emerged from the ground or growing medium.

As used herein "pre-harvest desiccation" refers to a method of drying or killing crops intentionally before harvest at a specific stage of crop development, typically when the crop has reached physiological maturity but is not yet fully dried, to promote uniform ripening and to facilitate the harvesting process.

As used herein, "non-crop area" refers to any area of land that is not used for the cultivation of crops or agricultural production. The combinations or compositions according to the present invention can be applied in non-crop areas for weed control and vegetation management. For example, the combinations or compositions according to the present invention can be used to control weeds and unwanted plant growth in lawns, parks, and gardens. They can also be used to maintain vegetation-free areas around roads, railways, sidewalks, and other infrastructure.

As used herein, "crop cultivation area" refers to any land that is used for growing crops, such as fields, gardens, orchards, vineyards, etc. Commonly, herbicides are applied to these areas to control the growth of unwanted plants or weeds that can compete with crops for nutrients, water, and sunlight.

If the compounds described herein have one or more centres of chirality and, as a consequence, are present as enantiomers or diastereomers, it is possible to use both, the pure enantiomers and diastereomers and their mixtures, in the combinations or compositions according to the invention.

If the compounds described herein are capable of forming geometrical isomers, for example E/Z isomers, it is possible to use both, the pure isomers and mixtures thereof, in the combinations or compositions according to the invention.

If the compounds described herein can form tautomers by hydrogen displacement, reference to the compound by means of one tautomeric description is to be considered to include all tautomer forms.

If the compounds described herein have ionizable functional groups, they can also be employed in the form of their agriculturally acceptable salts. Suitable are the salts of those cations and the acid addition salts of those acids whose cations and anions, respectively, have no adverse effect on the activity of the active compounds.

Preferred cations are the ions of the alkali metals, preferably of lithium, sodium and potassium, of the alkaline earth metals, preferably of calcium and magnesium, and of the transition metals, preferably of manganese, copper, zinc and iron, further ammonium and substituted ammonium in which one to four hydrogen atoms are replaced by $C_1$-$C_4$-alkyl, hydroxy-$C_1$-$C_4$-alkyl, $C_1$-$C_4$-alkoxy-$C_1$-$C_4$-alkyl, hydroxy-$C_1$-$C_4$-alkoxy-$C_1$-$C_4$-alkyl, phenyl or benzyl, preferably ammonium, methylammonium, isopropylammonium, dimethylammonium, diethylammonium, diisopropylammonium, trimethylammonium, triethylammonium, tris (isopropyl)ammonium, heptylammonium, dodecylammonium, tetradecylammonium, tetramethylammonium, tetraethylammonium, tetrabutylammonium, 2-hydroxyethylammonium (olamine salt), 2-(2-hydroxyeth-1-oxy)eth-1-ylammonium (diglycolamine salt), di(2-hydroxyeth-1-yl)ammonium (diolamine salt), tris(2-hydroxyethyl)ammonium (trolamine salt), tris(2-hydroxypropyl)ammonium, benzyltrimethylammonium, benzyltriethylammonium, N,N,N-trimethylethanolammonium (choline salt), furthermore phosphonium ions, sulfonium ions, preferably tri($C_1$-$C_4$-alkyl) sulfonium, such as trimethylsulfonium, and sulfoxonium ions, preferably tri ($C_1$-$C_4$-alkyl) sulfoxonium, and finally the salts of polybasic amines such as N,N-bis-(3-aminopropyl)methylamine and diethylenetriamine.

Anions of useful acid addition salts are primarily chloride, bromide, fluoride, iodide, hydrogensulfate, methylsulfate, sulfate, dihydrogenphosphate, hydrogenphosphate, nitrate, bicarbonate, carbonate, hexafluorosilicate, hexafluorophosphate, benzoate and also the anions of $C_1$-$C_4$-alkanoic acids, preferably formate, acetate, propionate and butyrate.

Compounds having a carboxyl group can be employed in the form of the acid, in the form of an agriculturally suitable salt as mentioned above or else in the form of an agriculturally acceptable derivative, for example as amides, such as mono- and di-$C_1$-$C_6$-alkylamides or arylamides, as esters, for example as allyl esters, propargyl esters, $C_1$-$C_{10}$-alkyl esters, alkoxyalkyl esters, tefuryl ((tetrahydrofuran-2-yl) methyl) esters and also as thioesters, for example as $C_1$-$C_{10}$-alkylthio esters. Preferred mono- and di-$C_1$-$C_6$-alkylamides are the methyl and the dimethylamides. Preferred arylamides are, for example, the anilides and the 2-chloroanilides. Preferred alkyl esters are, for example, the methyl, ethyl, propyl, isopropyl, butyl, isobutyl, pentyl, mexyl(1-methylhexyl), meptyl(1-methylheptyl), heptyl, octyl or isooctyl(2-ethylhexyl) esters. Preferred $C_1$-$C_4$-alkoxy-$C_1$-$C_4$-alkyl esters are the straight-chain or branched $C_1$-$C_4$-alkoxy ethyl esters, for example the 2-methoxyethyl, 2-ethoxyethyl, 2-butoxyethyl (butotyl), 2-butoxypropyl or 3-butoxypropyl ester. An example of a straight-chain or branched $C_1$-$C_{10}$-alkylthio ester is the ethylthio ester.

The combinations or compositions of the present invention may additionally comprise a further active ingredient as a Component C. Preferably, the further active ingredient C is selected from Protoporphyrinogen Oxidase (PPO) inhibitors, in particular, the PPO inhibitors C.1-C.62 listed below in Table C:

TABLE C

| PPO inhibitors (C) | |
| --- | --- |
| C.1 | acifluorfen |
| C.2 | acifluorfen-sodium |
| C.3 | azafenidin |
| C.4 | bifenox |
| C.5 | butafenacil |
| C.6 | carfentrazone |
| C.7 | carfentrazone-ethyl |
| C.8 | chlomethoxyfen |
| C.9 | chlorphthalim |
| C.10 | chlornitrofen |
| C.11 | cyclopyranil |
| C.12 | flufenoximacil |
| C.13 | flumiclorac |
| C.14 | flumiclorac-pentyl |
| C.15 | flumioxazin |
| C.16 | flumipropyn |
| C.17 | fluorodifen |
| C.18 | fluoroglycofen |
| C.19 | fluoroglycofen-ethyl |
| C.20 | fluoronitrofen |
| C.21 | fluthiacet |
| C.22 | fluthiacet-methyl |
| C.23 | fomesafen |
| C.24 | isoxafenacil |
| C.25 | lactofen |
| C.26 | nitrofen |
| C.27 | oxadiargyl |
| C.28 | oxadiazon |
| C.29 | oxyfluorfen |
| C.30 | pentoxazone |
| C.31 | pyraclonil |
| C.32 | pyraflufen |
| C.33 | pyraflufen-ethyl |
| C.34 | sulfentrazone |
| C.35 | tiafenacil |
| C.36 | trifludimoxazin |
| C.37 | 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-acetic acid methyl ester (CAS 2158274-96-3) |
| C.38 | 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy] acetic acid ethyl ester (CAS 2158274-50-9) |
| C.39 | methyl 2-[3-[2-chloro-5-[4-(difluoromethyl)-3-methyl-5-oxo-1,2,4-triazol-1-yl]-4-fluoro-phenoxy]-2-pyridyl]oxylacetate (CAS 2271389-22-9) |

TABLE C-continued

| | PPO inhibitors (C) |
|---|---|
| C.40 | ethyl 2-[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4) |
| C.41 | 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy] acetic acid ethyl ester (CAS 2158274-56-5) |
| C.42 | methyl 2-[2-[2-bromo-5-[3,6-dihydro-3-methyl-2,6-dioxo-4-(trifluoromethyl)-1(2H)-pyrimidinyl]-4-fluorophenoxy]phenoxy]-2-methoxyacetate (CAS 2703795-90-6) |
| C.43 | 2-pyridylmethyl 2-[[3-[2-chloro-4-fluoro-5-[3-methyl-2,6-dioxo-4-(trifluoromethyl)pyrimidin-1-yl]phenoxy]-2-pyridyl]oxy]acetate (CAS 2591611-15-1) |
| C.44 | 2-methoxyethyl 2-[[3-[2-chloro-4-fluoro-5-[3-methyl-2,6-dioxo-4-(trifluoromethyl)pyrimidin-1-yl]phenoxy]-2-pyridyl]oxy]acetate (CAS 2591611-05-09) |
| C.45 | 2-methoxyethyl [(3-{2-cyano-4-fluoro-5-[3-methyl-2,6-dioxo-4-(trifluoromethyl)-3,6-dihydropyrimidin-1(2H)-yl]phenoxy}pyridin-2-yl)oxy]acetate (CAS 2591611-20-8) |
| C.46 | cyanomethyl [(3-{2-bromo-4-fluoro-5-[3-methyl-2,6-dioxo-4-(trifluoromethyl)-3,6-dihydropyrimidin-1 (2H)-yl]phenoxy}pyridin-2-yl)oxy]acetate (CAS 2591610-84-1) |
| C.47 | 2-ethoxy-2-oxoethyl 1-{2-chloro-4-fluoro-5-[3-methyl-2,6-dioxo-4-(trifluoromethyl)-3,6-dihydropyrimidin-1(2H)-yl]phenoxy}cyclopropane-carboxylate (CAS 1101020-13-6) |
| C.48 | 2-methoxy-2-oxoethyl 1-{2-chloro-4-fluoro-5-[3-methyl-2,6-dioxo-4-(trifluoromethyl)-3,6-dihydropyrimidin-1(2H)-yl]phenoxy}cyclopropane-carboxylate (CAS 1101021-05-9) |
| C.49 | {[(1-{2-chloro-4-fluoro-5-[3-methyl-2,6-dioxo-4-(trifluoromethyl)-3,6-dihydropyrimidin-1(2H)-yl]phenoxy}cyclopropyl)carbonyl]oxy}acetic acid (CAS 1101020-12-5) |

Hence, in one embodiment, the combinations or compositions of the present invention comprise (A) saflufenacil, (B) epyrifenacil and (C) a PPO inhibitor selected from acifluorfen, acifluorfen-sodium, azafenidin, bifenox, butafenacil, carfentrazone, carfentrazone-ethyl, chlomethoxyfen, chlorphthalim, chlornitrofen, cyclopyranil, flufenoximacil, flumiclorac, flumiclorac-pentyl, flumioxazin, flumipropyn, fluorodifen, fluoroglycofen, fluoroglycofen-ethyl, fluoronitrofen, fluthiacet, fluthiacet-methyl, fomesafen, isoxafenacil, lactofen, nitrofen, oxadiargyl, oxadiazon, oxyfluorfen, pentoxazone, pyraclonil, pyraflufen, pyraflufen-ethyl, sulfentrazone, tiafenacil, trifludimoxazin, 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]-acetic acid methyl ester (CAS 2158274-96-3), 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]acetic acid ethyl ester (CAS 2158274-50-9), methyl 2-[[3-[2-chloro-5-[4-(difluoromethyl)-3-methyl-5-oxo-1,2,4- triazol-1-yl]-4-fluoro-phenoxy]-2-pyridyl]oxy]acetate (CAS 2271389-22-9), ethyl 2-[[3-[2-chloro-5-[4-(difluoromethyl)-3-methyl-5-oxo-1,2,4-triazol-1-yl]-4-fluoro-phenoxy]-2-pyridyl]oxy]acetate (CAS 2230679-62-4), 2-[[3-[[3-chloro-6-[3,6-dihydro-3-methyl-2,6-dioxo-4-(trifluoromethyl)-1(2H)-pyrimidinyl]-5-fluoro-2-pyridinyl]oxy]-2-pyridinyl]oxy]acetic acid ethyl ester (CAS 2158274-56-5), methyl 2-[2-[2-bromo-5-[3,6-dihydro-3-methyl-2,6-dioxo-4-(trifluoromethyl)-1(2H)-pyrimidinyl]-4-fluorophenoxy]phenoxy]-2-methoxyacetate (CAS 2703795-90-6), 2-pyridylmethyl 2-[[3-[2-chloro-4-fluoro-5-[3-methyl-2,6-dioxo-4-(trifluoromethyl)pyrimidin-1-yl]phenoxy]-2-pyridyl]oxy]acetate (CAS 2591611-15-1), 2-methoxyethyl 2-[[3-[2-chloro-4-fluoro-5-[3-methyl-2,6-dioxo-4-(trifluoromethyl)pyrimidin-1-yl]phenoxy]-2-pyridyl]oxy]acetate (CAS 2591611-05-9), 2-methoxyethyl[(3-{2-cyano-4-fluoro-5-[3-methyl-2,6-dioxo-4-(trifluoromethyl)-3,6-dihydropyrimidin-1(2H)-yl]phenoxy}pyridin-2-yl)oxy]acetate (CAS 2591611-20-8), cyanomethyl[(3-{2-bromo-4-fluoro-5-[3-methyl-2,6-dioxo-4-(trifluoromethyl)-3,6-dihydropyrimidin-1(2H)-yl]phenoxy}pyridin-2-yl)oxy]acetate (CAS 2591610-84-1), 2-ethoxy-2-oxoethyl 1-{2-chloro-4-fluoro-5-[3-methyl-2,6-dioxo-4-(trifluoromethyl)-3,6-dihydropyrimidin-1(2H)-yl]phenoxy}cyclopropane-carboxylate (CAS 1101020-13-6), 2-methoxy-2-oxoethyl 1-{2-chloro-4-fluoro-5-[3-methyl-2,6-dioxo-4-(trifluoromethyl)-3,6-dihydropyrimidin-1(2H)-yl]phenoxy}cyclopropane-carboxylate (CAS 1101021-05-9), {[(1-{2-chloro-4-fluoro-5-[3-methyl-2,6-dioxo-4-(trifluoromethyl)-3,6-dihydropyrimidin-1(2H)-yl]phenoxy}cyclopropyl)carbonyl]oxy}acetic acid (CAS 1101020-12-5), wherein the weight ratio [w/w] of (A):(B) is from 20:1 to 1:20, for example 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20.

Specific combinations or compositions according to the invention are listed below (A is saflufenacil, B is epyrifenacil and C is a PPO inhibitor, each as defined in the respective line of Table 1):

A+B+C.1, A+B+C.2, A+B+C.3, A+B+C.4, A+B+C.5, A+B+C.6, A+B+C.7, A+B+C.8, A+B+C.9, A+B+C.10, A+B+C.11, A+B+C.12, A+B+C.13, A+B+C.14, A+B+C.15, A+B+C.16, A+B+C.17, A+B+C. 18, A+B+C.19, A+B+C.20, A+B+C.21, A+B+C.22, A+B+C.23, A+B+C.24, A+B+C.25, A+B+C.26, A+B+C.27, A+B+C.28, A+B+C.29, A+B+C.30, A+B+C.31, A+B+C.32, A+B+C.33, A+B+C.34, A+B+C.35, A+B+C.36, A+B+C.37, A+B+C.38, A+B+C.39, A+B+C.40, A+B+C.41, A+B+C.42, A+B+C.43, A+B+C.44, A+B+C.45, A+B+C.46, A+B+C.47, A+B+C.48, A+B+C.49.

Preferred are the combinations or compositions comprising saflufenacil (A), epyrifenacil (B) and trifludimoxazin (C.36), wherein the weight ratio [w/w] of (A):(B) is from 20:1 to 1:20.

Further preferred are the combinations or compositions comprising saflufenacil (A), epyrifenacil (B) and (2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]acetic acid ethyl ester (C.38), wherein the weight ratio [w/w] of (A):(B) is from 20:1 to 1:20.

In the ternary combinations or compositions of the invention the weight ratio [w/w] of saflufenacil (A):epyrifenacil (B) is from 20:1 to 1:20, saflufenacil (A):PPO herbicide (C) is usually from 20:1 to 1:20 and PPO herbicide (C):epyrifenacil (B) is usually from 20:1 to 1:20.

Preferred weight ratios [w/w/w] of (A):(B):(C) are

| | | | | | | | | | |
|---|---|---|---|---|---|---|---|---|---|
| 1:1:1 | 1:3:3 | 1:5:5 | 2:3:4 | 3:1:3 | 3:4:1 | 4:1:3 | 4:4:3 | 5:2:1 | 5:4:3 |
| 1:1:2 | 1:3:4 | 2:1:1 | 2:3:5 | 3:1:4 | 3:4:2 | 4:1:4 | 4:4:5 | 5:2:2 | 5:4:4 |
| 1:1:3 | 1:3:5 | 2:1:2 | 2:4:1 | 3:1:5 | 3:4:3 | 4:1:5 | 4:5:1 | 5:2:3 | 5:4:5 |
| 1:1:4 | 1:4:1 | 2:1:3 | 2:4:3 | 3:2:1 | 3:4:4 | 4:2:1 | 4:5:2 | 5:2:4 | 5:5:1 |
| 1:1:5 | 1:4:2 | 2:1:4 | 2:4:5 | 3:2:2 | 3:4:5 | 4:2:3 | 4:5:3 | 5:2:5 | 5:5:2 |
| 1:2:1 | 1:4:3 | 2:1:5 | 2:5:1 | 3:2:3 | 3:5:1 | 4:2:5 | 4:5:4 | 5:3:1 | 5:5:3 |
| 1:2:2 | 1:4:4 | 2:2:1 | 2:5:2 | 3:2:4 | 3:5:2 | 4:3:1 | 4:5:5 | 5:3:2 | 5:5:4 |
| 1:2:3 | 1:4:5 | 2:2:3 | 2:5:3 | 3:2:5 | 3:5:3 | 4:3:2 | 5:1:1 | 5:3:3 | |
| 1:2:4 | 1:5:1 | 2:2:5 | 2:5:4 | 3:3:1 | 3:5:4 | 4:3:3 | 5:1:2 | 5:3:4 | |
| 1:2:5 | 1:5:2 | 2:3:1 | 2:5:5 | 3:3:2 | 3:5:5 | 4:3:4 | 5:1:3 | 5:3:5 | |
| 1:3:1 | 1:5:3 | 2:3:2 | 3:1:1 | 3:3:4 | 4:1:1 | 4:3:5 | 5:1:4 | 5:4:1 | |
| 1:3:2 | 1:5:4 | 2:3:3 | 3:1:2 | 3:3:5 | 4:1:2 | 4:4:1 | 5:1:5 | 5:4:2 | |

Preferred are the combinations or compositions comprising saflufenacil (A), epyrifenacil (B) and trifludimoxazin (C.36) in the weight ratios of (A):(B):(C.36) being 1:1:1, 1:1:2, 1:2:1 or 2:1:1.

Further preferred are the combinations or compositions comprising saflufenacil (A), epyrifenacil (B) and (2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]acetic acid ethyl ester (C.38) in the weight ratios of (A):(B):(C.38) being 1:1:1, 1:1:2, 1:2:1 or 2:1:1.

In the methods according to the present invention, the required application rate of the PPO herbicide (C) depends on the density of the undesired vegetation, on the development stage of the plants, on the climatic conditions of the location where the combination or composition according to the invention is used and on the application method.

The application rate of the PPO herbicide (C) is usually from 1 to 500 g/ha, preferably from 1 to 250 g/ha, more preferably from 2 to 100 g/ha, most preferably from 5 to 50 g/ha of active substance, e.g. 5 g/ha, 6 g/ha, 7 g/ha, 8 g/ha, 9 g/ha, 10 g/ha, 11 g/ha, 12 g/ha, 13 g/ha, 14 g/ha, 15 g/ha, 16 g/ha, 17 g/ha, 18 g/ha, 19 g/ha, 20 g/ha, 21 g/ha, 22 g/ha, 23 g/ha, 24 g/ha, 25 g/ha, 26 g/ha, 27 g/ha, 28 g/ha, 29 g/ha, 30 g/ha, 31 g/ha, 32 g/ha, 33 g/ha, 34 g/ha, 35 g/ha, 36 g/ha, 37 g/ha, 38 g/ha, 39 g/ha, 40 g/ha, 41 g/ha, 42 g/ha, 43 g/ha, 44 g/ha, 45 g/ha, 46 g/ha, 47 g/ha, 48 g/ha, 49 g/ha, 50 g/ha.

In the preferred methods according to the present invention, saflufenacil (A), epyrifenacil (B) and a PPO herbicide (C), preferably C.36 or C.38 are used at the application rates of Table ABC.

TABLE ABC

| A, g/ha | B, g/ha | C, g/ha | A, g/ha | B, g/ha | C, g/ha |
|---|---|---|---|---|---|
| 12.5 | 12.5 | 12.5 | 12.5 | 25 | 25 |
| 25 | 12.5 | 12.5 | 25 | 25 | 12.5 |
| 12.5 | 25 | 12.5 | 25 | 12.5 | 25 |
| 12.5 | 12.5 | 25 | 25 | 25 | 25 |

The combinations or compositions of the present invention may additionally comprise a safener S.

Safeners are chemical compounds which may protect crops from herbicide-induced damage, i.e. benoxacor, cloquintocet, cyometrinil, cyprosulfamide, dichlormid, dicyclonon, dietholate, fenchlorazole, fenclorim, flurazole, fluxofenim, furilazole, isoxadifen, mefenpyr, mephenate, naphthalic anhydride, oxabetrinil, 4-(dichloroacetyl)-1-oxa-4-azaspiro[4.5]decane (MON4660, CAS 71526-07-3), 2,2,5-trimethyl-3-(dichloroacetyl)-1,3-oxazolidine (R-29148, CAS 52836-31-4), metcamifen, BPCMS (CAS 54091-06-4).

Saflufenacil, epyrifenacil, PPO inhibitors and safeners, their preparation and activity are known. Many of them are commercially available. For compounds defined by the common name see e.g. www.bcpcpesticidecompendium.bcpc.org/. For compounds defined by the IUPAC name see e.g. WO 2017/202768, WO 2018/108695, WO 2021/013799, WO 2021/175689, and WO 2022/138633. For unambiguous identification, the compounds defined by the IUPAC name are supplemented by the "CAS" (Chemical Abstracts Service) registry number. As to the given mechanisms of action and classification of the herbicides B, see e.g "HRAC Global Herbicide Mode of Action (MOA) classification".

The combinations or compositions according to the present invention are suitable for application in non-crop areas and in crop cultivation areas. According to one embodiment, the weeds are controlled in non-crop areas. According to another embodiment, the weeds are controlled in crop cultivation areas.

If not stated otherwise, the combinations or compositions according to the present invention are suitable for application in any variety of crops as outlined herein.

In the context of the present invention, crop plants (cultivated plants) are understood to comprise all species, subspecies, variants and/or hybrids which belong to the respective cultivated plants, including but not limited to winter and spring varieties, in particular in cereals such as wheat and barley, e.g. winter wheat, spring wheat, winter barley etc., Winter wheat varieties of the species *Triticum aestivum* L. (TRZAW) include varieties such as Cubus, Chevignon, Foxx, Informer, Extase, and Skyscraper.

The combinations or compositions according to the present invention are generally suitable for controlling weeds in the following crops:

*Allium cepa* (onions), *Allium sativum* (garlic), *Ananas comosus* (pineapples), *Arachis hypogaea* [peanuts (groundnuts)], *Asparagus officinalis* (asparagus), *Beta vulgaris* spec. *altissima* (sugar beet), *Beta vulgaris* spec. *rapa* (turnips), *Camellia sinensis* (tea plants), *Carthamus tinctorius* (safflower), *Carya illinoinensis* (pecan trees), *Citrus limon* (lemons), *Citrus sinensis* (orange trees), *Coffea arabica, Coffea canephora, Coffea liberica* (coffee plants), *Cucumis sativus* (cucumber), *Cynodon dactylon* (Bermudagrass), *Daucus carota* subspec. *sativa* (carrot), *Elaeis guineensis* (oil palms), Fragaria *vesca* (strawberries), *Glycine max* (soybeans), *Gossypium hirsutum, Gossypium arboreum, Gossypium herbaceum, Gossypium vitifolium, Hevea brasiliensis* (rubber plants), *Hordeum vulgare* (barley), *Humulus lupulus* (hops), *Ipomoea batatas* (sweet potatoes), *Juglans regia* (walnut trees), *Lens culinaris* (lentil), *Linum usitatissimum* (flax), *Lycopersicon lycopersicum* (tomatoes), *Malus* spec. (apple trees), *Manihot esculenta* (cassava), *Medicago sativa* [alfalfa (lucerne)], *Musa* spec. (banana plants), *Nicotiana tabacum* (*N. rustica*) (tobacco), *Olea europaea* (olive trees), *Oryza sativa* (rice), *Phaseolus lunatus* (limabeans), *Phaseolus vulgaris* (snapbeans, green beans, dry beans), *Picea abies* (Norway spruce), *Pinus* spec. (pine trees), *Pistacia vera* (pistachio), *Pisum sativum* (English peas), *Prunus avium* (cherry trees), *Prunus persica* (peach trees), *Pyrus communis* (pear trees), *Prunus armeniaca* (apricot), *Prunus cerasus* (sour cherry), *Prunus dulcis* (almond trees) and *prunus domestica* (plum trees), *Ribes sylvestre* (redcurrants), *Ricinus communis* (castor-oil plants), *Saccharum officinarum* (sugar cane), *Secale cereale* (rye), *Sinapis alba*, *Solanum tuberosum* (Irish potatoes), *Sorghum bicolor* (s. *vulgare*) (*sorghum*), *Theobroma cacao* (cacao plants), *Trifolium pratense* (red clover), *Triticum aestivum* (wheat), Triticale (triticale), *Triticum durum* (durum wheat), *Triticum turgidum* (hard wheat), *Triticum spelta* (Spelt), *Vicia faba* (tick beans), *Vitis vinifera* (grapes), and *Zea mays* (maize, e.g. Indian corn, sweet corn, popcorn, seed corn and field corn).

The combinations or compositions according to the present invention are particularly suitable for controlling weeds in the following crops:

*Allium cepa*, *Allium sativum*, *Arachis hypogaea*, *Beta vulgaris* spec. *altissima*, *Cynodon dactylon*, *Daucus carota* subspec. *sativa*, *Glycine max*, *Gossypium hirsutum*, *Gossypium arboreum*, *Gossypium herbaceum*, *Gossypium vitifolium*, *Hordeum vulgare*, *Lens culinaris*, *Linum usitatissimum*, *Lycopersicon lycopersicum*, *Malus* spec., *Medicago sativa*, *Oryza sativa*, *Phaseolus lunatus*, *Phaseolus vulgaris*, *Pisum sativum*, *Saccharum officinarum*, *Secale cereale*, *Solanum tuberosum*, *Sorghum bicolor* (s. *vulgare*), *Triticale*, *Triticum aestivum*, *Triticum durum*, *Vicia faba*, *Vitis vinifera*, and *Zea mays* (maize, e.g. Indian corn, sweet corn, popcorn, seed corn and field corn).

Generally, the combinations or compositions according to the present invention are useful for pre-harvest desiccation of crops and for controlling weeds in pre-plant burn-down treatments, in pre-emergence treatments of crops, or post-emergence treatments of PPO inhibitor tolerant crops.

In a particular embodiment, the combinations or compositions according to the present invention are used as pre-plant burn-down treatment of a non-crop area or of a field or area before planting crops such as wheat, barley, rye, triticale, corn (maize, e.g. Indian corn, sweet corn, popcorn, seed corn and field corn), soybean (determinate and indeterminate), cotton, canola, *sorghum*, rice, peas, *Vicia*-beans, *Phaseolus*-beans, peanuts, cotton, potato, sugar beet, sugarcane and vegetables.

In a preferred embodiment, the combinations or compositions according to the present invention are used for controlling weeds pre-emergence of crops such as cereals, corn (maize, e.g. Indian corn, sweet corn, popcorn, seed corn and field corn), soybean (determinate and indeterminate), cotton, canola, *sorghum*, rice, peas, *Vicia*-beans, *Phaseolus*-beans, peanuts, cotton, potato, sugar beet, sugarcane, and vegetables.

The combinations or compositions according to the present invention are very particularly suitable for controlling weeds in fields of soybeans, cotton and corn.

In another preferred embodiment, the combinations or compositions according to the present invention are used for pre-harvest desiccation, e.g. in cereals, soybean (determinate and indeterminate), corn (maize, e.g. Indian corn, sweet corn, popcorn, seed corn and field corn), cotton, canola, *sorghum* and rice.

In another preferred embodiment, the combinations or compositions according to the present invention are used for controlling weeds post-emergence of herbicide tolerant crops, in particular post-emergence of PPO inhibitor tolerant crops such as soybean (determinate and indeterminate), corn (maize, e.g. Indian corn, sweet corn, popcorn, seed corn and field corn), cotton and canola.

The term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes.

Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione.

Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicies: bxn, for tolerance to sulfonylurea herbicides: zm-hra, csr1-2, gm-hra, S4-HrA, for tolerance to ALS inhibitor herbicides: csr1-2, for tolerance to HPPD inhibitor herbicides: hppdPF, W336 and avhppd-03. Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHG0JG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHTØH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A (a), vip3Aa20. However, also genes of plant origin have been transferred to other plants. In particular genes coding for protease inhibitors, like CpTI and pinII. A further approach uses transgenes in order to produce double stranded RNA in plants to target and down-regulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR 162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (isaaa.org/gmapprovaldatabase) and the "Center for Environmental Risk Assessment (CERA)" (cera-gmc.org/GM-CropDatabase), as well as in patent applications, like EP3028573 and WO2017/011288.

The use of combinations and compositions according to the invention on crops may result in effects which are specific to a crop comprising a certain gene or event. These effects might involve changes in growth behavior or changed resistance to biotic or abiotic stress factors.

Such effects may in particular comprise enhanced yield, enhanced resistance or tolerance to insects, nematodes, fungal, bacterial, *mycoplasma*, viral or viroid pathogens as well as early vigour, early or delayed ripening, cold or heat tolerance as well as changed amino acid or fatty acid spectrum or content.

Furthermore, plants are also covered that contain by the use of recombinant DNA techniques a modified amount of ingredients or new ingredients, specifically to improve raw material production, e.g., potatoes that produce increased amounts of amylopectin.

The combinations and compositions according to the present invention are useful for controlling a large variety of harmful plants (undesired vegetation), including monocotyledonous weeds and dicotyledonous weeds from various genera and species, such as *Abutilon, Aeschynomene, Alisma, Alopecurus, Alternanthera, Amaranthus, Ambrosia, Ammannia, Anagallis, Anthemis, Arctium, Arctotheca, Bacopa, Bassia, Bidens, Bifora, Bolboschoenus, Brachiaria, Brassica, Bromus secalinus, Bromus sterilis, Bromus tectorum, Caperonia, Capsella, Calystegia, Centaurea, Cenchrus, Che-nopodium, Chloris, Cleome, Commelina, Convolvulus, Conyza, Cynodon, Cyperus, Descurainia, Desmodium, Digitaria, Echinochloa, Eclipta, Eleocharis, Eleusine, Elymus, Eriochloa, Erigeron, Equisetum, Erodium, Euphorbia, Fagopyrum, Fimbristylis, Galium, Galeopsis, Geranium, Helianthus annuus, Helianthus, Heteranthera, Ipomoea, Ischaemum, Isolepis, Kochia, Lactuca, Lamium, Lappula, Leersia, Leptochloa, Lepidium, Lindernia, Limnocharis, Linum, Lolium, Ludwigia, Luziola, Malva, Marsilia, Matricaria, Melochia, Mollugo, Monochoria, Monochoria, Oryza latifolia, Oryza rufipogon, Panicum, Papaver, Paspalum, Persicaria, Phalaris, Plantago, Poa, Polygonum, Pontederia, Portulaca, Potamogeton, Puccinellia, Raphanus, Rapistrum, Rottboellia, Rumex, Sagittaria, Schoenoplectiella, Schoenoplectus, Scirpoides, Scirpus, Sclerochloa, Sesbania, Setaria, Sida, Sinapis, Sisymbrium, Sonchus, Sphenoclea, Sorghum halepense, Stellaria, Thlaspi, Tragopogon, Trichophorum, Trifolium, Tri-pleurospermum, Typha, Urtica, Urochloa, Veronica, Vicia, Viola* and *Xanthium*.

In particular the following weed species can be controlled: *Abutilon theophrasti, Amaranthus albus, Amaranthus blitoides, Amaranthus hybridus, Amaranthus palmeri, Amaranthus powellii, Amaranthus retroflexus, Amaranthus tuberculatus, Amaranthus rudis, Amaranthus viridis, Ambrosia artemisifolia, Ammannia auriculata, Ammannia baccifera, Ammannia multiflora, Anthemis arvensis, Capsella bursa-pastoris, Centaurea cyanus, Chenopodium album, Chenopodium ficifolium, Chenopodium polyspermum, Chenopodium hybridum, Commelina benghalensis, Conyza bonariensis, Conyza canadensis, Descurania sophia, Galium aparine, Galium spurium, Galium tricornutum, Galeopsis tetrahit, Geranium dissectum, Geranium pusillum, Kochia scoparia, Lamium amplexicaule, Lamium purpureum, Limnocharis flava, Ludwigia decur-*

*rens, Ludwigia octovalvis, Ludwigia prostrata, Matricaria chamomilla, Matricaria discoidea, Matricaria inodora, Papaver rhoeas, Polygonum convolvulus, Pontederia korsakowii, Pontederia vaginalis, Potamogeton distinctus, Papaver rhoeas, Raphanus raphanistrum, Sinapis alba, Sinapis arvensis, Sisymbrium officinale, Sisymbrium orientale, Stellaria media, Sphenoclea zeylanic, Thlaspi arvense, Tripleu-rospermum inodorum, Veronica hederifolia* and *Veronica persica* and *Viola arvensis.*

The combinations or compositions of the present invention can be applied in conventional manner by using techniques a skilled person is familiar with. Suitable techniques include spraying, atomizing, dusting, spreading or watering. The type of application depends on the intended purpose in a well-known manner; in any case, it should ensure the finest possible distribution of the active ingredients.

If the combinations or compositions of the present invention is less well tolerated by certain crop plants, application techniques may be used in which the herbicidal composition is sprayed, with the aid of the spray apparatus, in such a way that they come into as little contact, if any, as possible with the leaves of the sensitive crop plants while reaching the leaves of undesirable plants which grow underneath, or the bare soil (post-directed, lay-by).

The combinations or compositions of the present invention is applied to an area mainly by spraying, in particular foliar spraying of an aqueous dilution of the active ingredient of the composition. Application can be carried out by customary spraying techniques using, for example, water as carrier and spray liquor rates of from about 10 to 2000 l/ha or 50 to 1000 l/ha, for example from 100 to 500 l/ha. Application of the herbicidal combinations or compositions by the low-volume and the ultra-low-volume method is possible, as is their application in the form of microgranules.

The combinations or compositions of the invention may also be applied in combination with, or by utilizing smart agricultural technologies, such as precision agriculture, remote and proximate imaging and image recognition, or smart agricultural site management programs. These smart agricultural technologies typically include models, e.g. computer programs, that support the user by considering information from a wide variety of sources to increase the quality and yield of harvested material, reduce damage by pests including the prediction of pest pressure and smart application of crop protection products, secure environmental protection, support quick and reliable agronomic decision making, reduce usage of fertilizers and crop protection products, reduce product residues in consumables increase spatial and temporal precision of agronomical measures, automate processes, and enable traceability of measures.

Commercially available systems which include agronomic models are e.g. FieldScripts™ from The Climate Corporation, Xarvio™ from BASF, AGLogic™ from John Deere, etc.

Information input for these models include but is not limited to soil data (e.g. pH, organic matter content, moisture level, nutrient content such as nitrogen, potassium, phosphorous and micro-nutrient content); information on the plants that are currently growing or that may grow at the area of interest including crop plants and/or weeds (e.g. type of plant, chlorophyl levels, biomass, growth stage, plant health, plant water status, plant growth models, genetic traits, biotic damage by infestation or infection with pests, abiotic damage as caused by drought or nutrient stress etc.); weather information (e.g. information on past and present, and forecast of future temperature, humidity, and/or precipitation); information on the location of the area and directly derivable information thereof (e.g. terrain features like altitude, slope, water bodies, sun exposure and hours of sunshine per day, vegetation period, etc.); information on pest pressure (e.g. information of the past or present occurrence of unwanted vegetation, fungal diseases and invertebrate pests at the area of interest, at neighboring areas, the region, or the vegetation zone); information on beneficial organisms (e.g. information of the past or present occurrence of beneficial organisms at the area of interest, at neighboring areas, the region, or the vegetation zone); and/or historic information of any of the aforementioned (e.g. information on previous seasons, or of an earlier point in time of the same season).

The information usable for precision agriculture may be based on input by at least one user, be accessible from external data sources and databases, or be based on sensor data. Data sources typically include proximate-detection systems like soil-borne sensors and remote sensing as may be achieved by imaging with unmanned airborne vehicles like drones, or satellites. Imaging technologies includes poly- and multispectral imagery in the UV-VIS, NIR and UV spectrum. Sensors may be included in an Internet-of-Things system and may be directly or indirectly connected to the processing unit, e.g. via a wireless network and/or cloud applications. The information is typically taken into account by at least one processing unit and used to provide recommendations, generate control signals (e.g. for the control of agricultural machinery like tractors, drones, irrigation systems, farm management systems and the like), and/or generate (digital) maps on the area of interest. These (digital) maps contain spatially and optionally temporally resolved information of the agricultural site, wherein the information may contain information directly gathered as described above, combinations thereof or derived thereof, such as pest pressure, nutrient levels, and the like. The recommendations, control signals and (digital) maps may relate to or be used for controlling the application of water, nutrients, agrochemical products, or plant propagation material to the field of interest, or for taking other management measures like tilling, physical or laser-induced weeding.

Typical technologies that are used in smart agricultural technologies include self-steering robots (such as tractors, harvesters, drones), artificial intelligence (e.g. machine learning), imaging technologies (e.g. image segmentation technologies), big data analysis, and model generation, cloud computing, and machine-to-machine communication.

Precision agriculture such as precision farming is characterized by spatially and/or temporally resolved, targeted application of active ingredients like pesticides, preferably the compositions according to the present invention, plant-growth-regulators, fertilizers, and/or water including the variation of application rates over the agronomic site, zone or spot application, and of the spatially and/or temporally resolved, targeted planting or seeding of desired plant propagation material to a agronomic site. Precision farming typically includes the use of geo-positioning technologies like GPS for gaining information on the location and boundaries of the area of interest, the utilized application equipment, sensing equipment and recorded data, and to control the actions of farm vehicles such as spraying. By combining geo-positioning data with (digital) maps, it is possible to (semi)-automate agricultural measures at the site of interest, e.g. by using (semi)-autonomous spraying or seeding equipment.

Precision farming may typically include the application of smart spraying equipment, e.g. spot spraying, and precision spraying at a farm, e.g. by irrigation systems, tractors, robots, helicopters, airplanes, unmanned aerial vehicles, such as drones. Such equipment usually includes input sensors (such as e.g. a camera) and a processing unit configured to analyze the input data and configured to provide a recommendation or decision based on the analysis of the input data to apply the compositions of the invention to the agronomic site, e.g. the soil or to control pests in a specific and precise manner.

For example, weeds may be detected, identified, and/or classified from imagery acquired by a camera. Such identification and/or classification can make use of image processing algorithms, which may utilize artificial intelligence (e.g. machine learning algorithms), or decision trees.

In this manner, the combinations or compositions described herein can be applied at the required location, point in time and dose rate.

The agrochemical compositions (formulations) according to the invention contain in addition to saflufenacil (Component A) and epyrifenacil (Component B) one or more auxiliaries customary for herbicidal products or crop protection compositions, e.g. at least one organic or inorganic carrier material. The formulations may also contain, if desired, one or more surfactants and, if desired, one or more further auxiliaries customary for herbicidal products or crop protection compositions.

In the formulations the active ingredients and optional further actives are present in suspended, emulsified or dissolved form. The formulation can be in the form of aqueous solutions, powders, suspensions, also highly-concentrated aqueous, oily or other suspensions or dispersions, aqueous emulsions, aqueous microemulsions, aqueous suspo-emulsions, oil dispersions, pastes, dusts, materials for spreading or granules.

Depending on the formulation type, they comprise one or more liquid or solid carriers, if appropriate surfactants (such as dispersants, protective colloids, emulsifiers, wetting agents and tackifiers), and if appropriate further auxiliaries which are customary for formulating crop protection products. The person skilled in the art is sufficiently familiar with the recipes for such formulations. Further auxiliaries include e.g. organic and inorganic thickeners, bactericides, antifreeze agents, antifoams, colorants and, for seed formulations, adhesives.

Suitable carriers include liquid and solid carriers. Liquid carriers include e.g. non-aqueous solvents such as cyclic and aromatic hydrocarbons, e.g. paraffins, tetrahydronaphthalene, alkylated naphthalenes and their derivatives, alkylated benzenes and their derivatives, alcohols such as methanol, ethanol, propanol, butanol and cyclohexanol, ketones such as cyclohexanone, strongly polar solvents, e.g. amines such as N-methylpyrrolidone, and water as well as mixtures thereof. Solid carriers include e.g. mineral earths such as silicas, silica gels, silicates, talc, kaolin, limestone, lime, chalk, bole, loess, clay, dolomite, diatomaceous earth, calcium sulfate, magnesium sulfate, magnesium oxide, ground synthetic materials, fertilizers such as ammonium sulfate, ammonium phosphate, ammonium nitrate, ureas, and products of vegetable origin such as cereal meal, tree bark meal, wood meal and nutshell meal, cellulose powders, or other solid carriers.

Suitable surfactants (adjuvants, wetting agents, tackifiers, dispersants and also emulsifiers) are the alkali metal salts, alkaline earth metal salts and ammonium salts of aromatic sulfonic acids, for example lignosulfonic acids (e.g. Borrespers-types, Borregaard), phenolsulfonic acids, naphthalenesulfonic acids (Morwet types, Akzo Nobel) and dibutylnaphthalenesulfonic acid (Nekal types, BASF AG), and of fatty acids, alkyl- and alkylarylsulfonates, alkyl sulfates, lauryl ether sulfates and fatty alcohol sulfates, and salts of sulfated hexa-, hepta- and octadecanols, and also of fatty alcohol glycol ethers, condensates of sulfonated naphthalene and its derivatives with formaldehyde, condensates of naphthalene or of the naphthalenesulfonic acids with phenol and formaldehyde, polyoxyethylene octylphenol ether, ethoxylated isooctyl-, octyl- or nonylphenol, alkylphenyl or tributylphenyl polyglycol ether, alkylaryl polyether alcohols, isotridecyl alcohol, fatty alcohol/ethylene oxide condensates, ethoxylated castor oil, polyoxyethylene alkyl ethers or polyoxypropylene alkyl ethers, lauryl alcohol polyglycol ether acetate, sorbitol esters, lignosulfite waste liquors and proteins, denatured proteins, polysaccharides (e.g. methylcellulose), hydrophobically modified starches, polyvinyl alcohol (Mowiol types Clariant), polycarboxylates (BASF AG, Sokalan types), polyalkoxylates, polyvinylamine (BASF AG, Lupamine types), polyethyleneimine (BASF AG, Lupasol types), polyvinylpyrrolidone and copolymers thereof.

The following commercial products are suitable adjuvants and can be added in a formulation or added as a tank mixing partner: Access®, Actirob BR, Adhasit®, Break-Thru S 301®, Cocana®, Dash® or Dash E.C.R, Designer®, Destiny®, Hasten®, Heliosol®, Kantor®, Karibu®, Leci-Tech®, Mero®, MSO®, PH-FIX Forte®, ProFital Fluid®, ProNet-Alfa®, Sulpro®, Trend®, Vivolt®, Vrusade®.

Examples of thickeners (i.e. compounds which impart to the formulation modified flow properties, i.e. high viscosity in the state of rest and low viscosity in motion) are polysaccharides, such as xanthan gum (Kelzan® from Kelco), Rhodopol® 23 (Rhone Poulenc) or Veegum® (from R. T. Vanderbilt), and also organic and inorganic sheet minerals, such as Attaclay® (from Engelhardt).

Examples of antifoams are silicone emulsions (such as, for example, Silikon® SRE, Wacker or Rhodorsil® from Rhodia), long-chain alcohols, fatty acids, salts of fatty acids, organofluorine compounds and mixtures thereof.

Bactericides can be added for stabilizing the aqueous herbicidal formulations. Examples of bactericides are bactericides based on diclorophen and benzyl alcohol hemiformal (Proxel® from ICI or Acticide® RS from Thor Chemie and Kathon® MK from Rohm & Haas), and also isothiazolinone derivates, such as alkylisothiazolinones and benzisothiazolinones (Acticide MBS from Thor Chemie).

Examples of antifreeze agents are ethylene glycol, propylene glycol, urea or glycerol.

Examples of colorants are both sparingly water-soluble pigments and water-soluble dyes. Examples which may be mentioned are the dyes known under the names Rhodamin B, C.I. Pigment Red 112 and C.I. Solvent Red 1, and also pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108.

Examples of adhesives are polyvinylpyrrolidone, polyvinyl acetate, polyvinyl alcohol and tylose.

To prepare emulsions, pastes or oil dispersions, the active components, as such or dissolved in an oil or solvent, can be homogenized in water by means of wetting agent, tackifier, dispersant or emulsifier. Alternatively, it is possible to prepare concentrates consisting of active substance, wetting agent, tackifier, dispersant or emulsifier and, if desired, solvent or oil, and these concentrates are suitable for dilution with water.

Powders, materials for spreading and dusts can be prepared by mixing or concomitant grinding of the active the herbicides A and B with a solid carrier.

Granules, e.g. coated granules, impregnated granules and homogeneous granules, can be prepared by binding the active ingredients to solid carriers.

The formulations comprise a herbicidally effective amount of the binary herbicide combination of the herbicide A and B. The concentrations of the active ingredients in the formulations can be varied within wide ranges. In general, the formulations comprise from 1 to 98% by weight, preferably 10 to 60% by weight, of active ingredients (sum of the herbicide A and B, and optionally further actives). The active ingredients are employed in a purity of from 90% to 100%, preferably 95% to 100% (according to NMR spectrum).

The combination comprising saflufenacil as Component A and epyrifenacil as Component B can, for example, be formulated as follows:

Products for Dilution with Water

A Water-Soluble Concentrates 10 parts by weight of the composition according to the invention are dissolved in 90 parts by weight of water or a water-soluble solvent. As an alternative, wetters or other adjuvants are added. The active compound dissolves upon dilution with water. This gives a formulation with an active compound content of 10% by weight.

B Dispersible Concentrates 20 parts by weight of the composition according to the invention are dissolved in 70 parts by weight of cyclohexanone with addition of 10 parts by weight of a dispersant, for example polyvinylpyrrolidone. Dilution with water gives a dispersion. The active compound content is 20% by weight.

C Emulsifiable Concentrates 15 parts by weight of the composition according to the invention are dissolved in 75 parts by weight of an organic solvent (e.g. alkylaromatics) with addition of calcium dodecylbenzenesulfonate and castor oil ethoxylate (in each case 5 parts by weight). Dilution with water gives an emulsion. The formulation has an active compound content of 15% by weight.

D Emulsions 25 parts by weight of the composition according to the invention are dissolved in 35 parts by weight of an organic solvent (e.g. alkylaromatics) with addition of calcium dodecylbenzenesulfonate and castor oil ethoxylate (in each case 5 parts by weight). This mixture is introduced into 30 parts by weight of water by means of an emulsifier (Ultraturrax) and made into a homogeneous emulsion. Dilution with water gives an emulsion. The formulation has an active compound content of 25% by weight.

E Suspensions

In an agitated ball mill, 20 parts by weight of the composition according to the invention are comminuted with addition of 10 parts by weight of dispersants and wetters and 70 parts by weight of water or an organic solvent to give a fine active compound suspension. Dilution with water gives a stable suspension of the active compound. The active compound content in the formulation is 20% by weight.

F Water-Dispersible Granules and Water-Soluble Granules 50 parts by weight the composition according to the invention are ground finely with addition of 50 parts by weight of dispersants and wetters and made into water-dispersible or water-soluble granules by means of technical appliances (for example extrusion, spray tower, fluidized bed). Dilution with water gives a stable dispersion or solution of the active compound. The formulation has an active compound content of 50% by weight.

G Water-Dispersible Powders and Water-Soluble Powders 75 parts by weight the composition according to the invention are ground in a rotor-stator mill with addition of 25 parts by weight of dispersants, wetters and silica gel. Dilution with water gives a stable dispersion or solution of the active compound. The active compound content of the formulation is 75% by weight.

H Gel Formulations

In a ball mill, 20 parts by weight the composition according to the invention, 10 parts by weight of dispersant, 1 part by weight of gelling agent and 70 parts by weight of water or of an organic solvent are mixed to give a fine suspension. Dilution with water gives a stable suspension with active compound content of 20% by weight.

Aqueous use forms can be prepared from emulsion concentrates, suspensions, pastes, wettable powders or water-dispersible granules by adding water.

It may furthermore be beneficial to apply the composition according to the invention alone or in combination with other herbicides, or else in the form of a mixture with other crop protection agents, for example together with agents for controlling pests or phytopathogenic fungi or bacteria. Also of interest is the miscibility with mineral salt solutions, which are employed for treating nutritional and trace element deficiencies. Other additives such as non-phytotoxic oils and oil concentrates may also be added.

USE EXAMPLES

The herbicidal activity of the combinations and compositions comprising saflufenacil as Component A and epyrifenacil as Component B was demonstrated by the following experiments:

Greenhouse:

The culture containers used were plastic flowerpots containing loamy sand with approximately 3.0% of organic matter as the substrate. The seeds of the test plants were sown separately for each species.

For the pre-emergence treatment, the test plants were first grown to a height of 2 to 25 cm, depending on the plant habit, and only then treated with the Components A and B, which had been suspended or emulsified in water.

For this purpose, the test plants were either sown directly and grown in the same containers, or they were first grown separately as seedlings and transplanted into the test containers a few days prior to treatment.

Depending on the species, the test plants were kept at 10-25° C. or 20-35° C., respectively. The test period extended over 2 to 4 weeks. During this time, the test plants were tended, and their response to the individual treatments was evaluated.

Field Trials

The trials were carried out across multiple agricultural sites with diverse soil types and climatic conditions to ensure comprehensive data collection. The herbicides were applied using a calibrated sprayer to ensure uniform application.

Each plot (2×2 m) was sprayed using a CO2 backpack sprayer, which was adjusted for a spray volume of 200 L/ha, and monitored for weed emergence and growth at regular intervals post-application. Weed density was recorded by counting the number of weeds per square meter, and weed biomass was measured by harvesting and weighing the above-ground parts of the weeds. Additionally, crop health was assessed by measuring parameters such as plant height, leaf chlorophyll content, and overall vigor.

Evaluation was carried out using a scale from 0 to 100. 100 means complete destruction of at least the aerial moieties, and 0 means no damage, or normal course of growth.

Colby's formula was applied to determine whether the composition showed synergistic action. The value E, which is to be expected if the activity of the individual compounds is just additive, was calculated using the method of S. R. Colby (1967) "Calculating synergistic and antagonistic responses of herbicide combinations", Weeds 15, p. 22 ff. For two component mixtures the value E was calculated by the following formula $$E = X + Y - (X \cdot Y / 100)$$

where

X=effect in percent using herbicide A at an application rate a;

Y=effect in percent using herbicide B at an application rate b;

E=expected effect (in %) of A+B at application rates a+b.

If the value observed in this manner is higher than the value E calculated according to Colby, a synergistic effect is present. Synergism is the ratio observed effect to the expected effect E in %.

The invention is elucidated in more detail by the examples hereinafter. DAT are dates after treatment.

Example 1: Herbicidal Activity Against *Echinochloa crus-galli* (ECHCG) at Weight Ratio of A:B being 4:1

| | solo application | | | | combination | | |
| | saflufenacil | | epyrifenacil | | saflufenacil + epyrifenacil | | |
| DAT | use rate (g ai/ha) | activity [%] | use rate (g ai/ha) | activity [%] | use rate (g ai/ha) | activity [%] | expected activity [%] |
| --- | --- | --- | --- | --- | --- | --- | --- |
| 14 | 50 | 20 | 12.5 | 25 | 50 + 12.5 | 65 | 40 |
| 21 | 50 | 38 | 12.5 | 38 | 50 + 12.5 | 68 | 62 |

Example 2: Herbicidal Activity Against *Echinochloa crus-galli* (ECHCG) at Weight Ratio of A:B being 2:1

| | solo application | | | | combination | | |
| | saflufenacil | | epyrifenacil | | saflufenacil + epyrifenacil | | |
| DAT | use rate (g ai/ha) | activity [%] | use rate (g ai/ha) | activity [%] | use rate (g ai/ha) | activity [%] | expected activity [%] |
| --- | --- | --- | --- | --- | --- | --- | --- |
| 14 | 50 | 60 | 25 | 68 | 50 + 25 | 97 | 87 |
| 21 | 50 | 48 | 25 | 60 | 50 + 25 | 90 | 79 |

The invention claimed is:

1. A herbicidal combination comprising
(A) saflufenacil and
(B) epyrifenacil
in a weight ratio [w/w] of (A):(B) from 8:1 to 1:8.

2. The herbicidal combination of claim 1, wherein the weight ratio [w/w] of (A):(B) is from 5:1 to 1:5.

3. The herbicidal combination of claim 1, wherein the weight ratio [w/w] of (A):(B) is 1:1.

4. The herbicidal combination of claim 1, further comprising an additional Protoporphyrinogen Oxidase (PPO) inhibitor as Component C.

5. The herbicidal combination of claim 4, wherein the further PPO inhibitor is trifludimoxazin.

6. The herbicidal combination of claim 5, wherein the weight ratio of saflufenacil:epyrifenacil:trifludimoxazin is 1:1:1.

7. The herbicidal combination of claim 4, wherein the further PPO inhibitor is 2-[2-[[3-chloro-6-[3,6-dihydro-3-methyl-2,6-dioxo-4-(trifluoromethyl)-1(2H)-pyrimidinyl]-5-fluoro-2-pyridinyl]oxy]phenoxy]acetic acid ethyl ester.

8. The herbicidal combination of claim 7, wherein the weight ratio of saflufenacil:epyrifenacil: 2-[2-[[3-chloro-6-[3,6-dihydro-3-methyl-2,6-dioxo-4-(trifluoromethyl)-1 (2H)-pyrimidinyl]-5-fluoro-2-pyridinyl]oxy]phenoxy]acetic acid ethyl ester is 1:1:1.

9. An agrochemical composition for weed control comprising (A) saflufenacil and (B) epyrifenacil in a weight ratio

[w/w] of (A):(B) from 8:1 to 1:820:1 to 1:20, and one or more auxiliaries customary for herbicidal products or crop protection compositions.

10. A method for controlling weeds, comprising applying an effective amount of a herbicidal combination to a non-crop area or to a cultivation area of a crop, where weeds grow or may grow,
the herbicidal combination comprising
(A) saflufenacil and
(B) epyrifenacil
in a weight ratio [w/w] of (A):(B) from 8:1 to 1:8.

11. The method of claim 10, wherein the application rate of (A) saflufenacil is from 2 to 100 g/ha and (B) epyrifenacil is from 2 to 100 g/ha.

12. The method of claim 10, wherein the application occurs in the cultivation area of a crop as a pre-planting burn-down treatment or pre-emergence treatment.

13. The method of claim 10, wherein application occurs in the cultivation area of PPO inhibitor tolerant crops as a post-emergence treatment.

14. The method of claim 11, wherein the application occurs in the cultivation area of a crop as a pre-planting burn-down treatment or pre-emergence treatment.

15. The method of claim 11, wherein application occurs in the cultivation area of PPO inhibitor tolerant crops as a post-emergence treatment.

\* \* \* \* \*